May 27, 1941.　　　H. A. KNOX　　　2,243,103
BRAKE
Filed Sept. 28, 1940
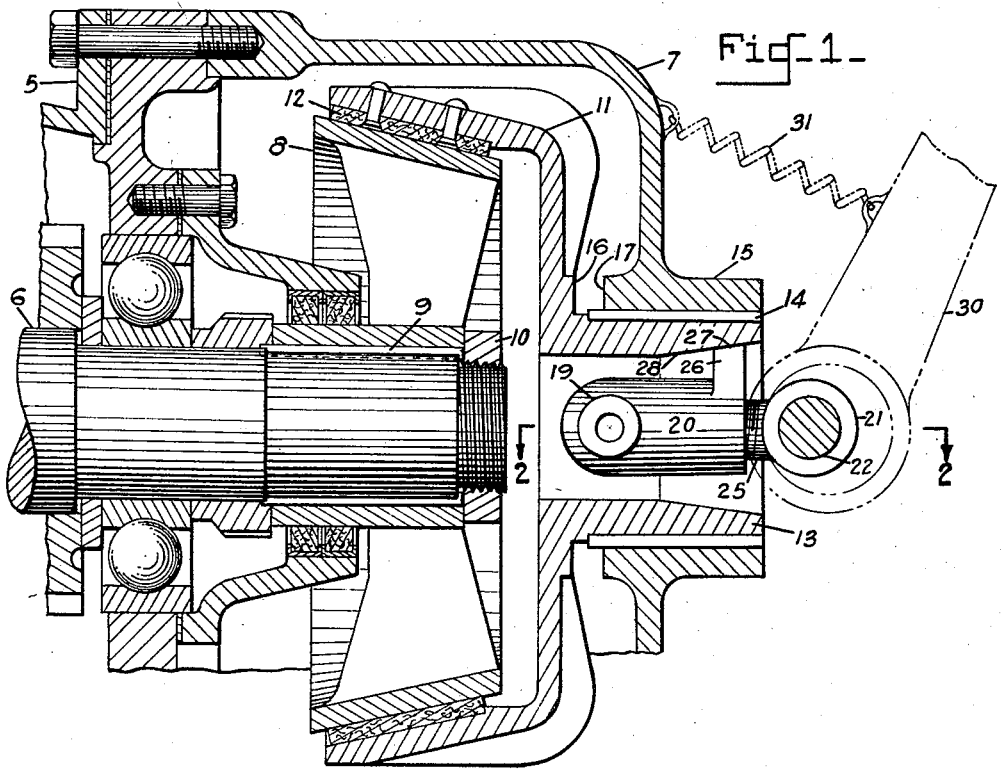
Fig-1-
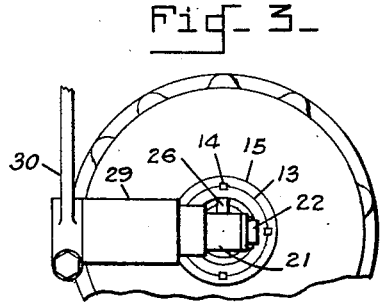
Fig-3-
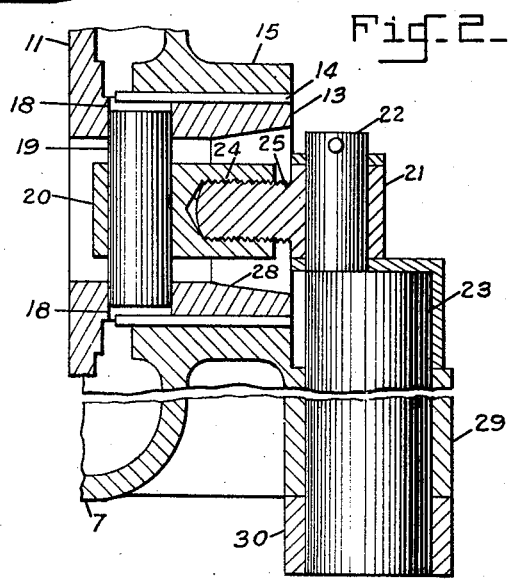
Fig-2-
INVENTOR
Harry A. Knox
BY Kessenich & J H Church
ATTORNEY Patented May 27, 1941

2,243,103

UNITED STATES PATENT OFFICE 2,243,103

BRAKE

Harry A. Knox, Washington, D. C.

Application September 28, 1940, Serial No. 358,801

5 Claims. (Cl. 188—71)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a brake and is particularly applicable to a transmission such as is used in heavy track-laying vehicles.

The purpose of the invention is to provide a simple and strong brake which may be readily associated with a rotatable shaft and which includes a slidable member actuated through a toggle.

The specific nature of the invention as well as other objects and advantages thereof will clearly appear from a description of a preferred embodiment as shown in the accompanying drawing in which:

Fig. 1 is a longitudinal sectional view through the brake;

Fig. 2 is a sectional view on the line 2—2 of Fig. 1;

Fig. 3 is a reduced view in end elevation of Fig. 1.

Referring to the drawing by characters of reference, there is shown a portion of the casing 5 of a transmission gear mechanism including a driven shaft 6. One end of the shaft 6 projects from the casing and is disposed within a housing 7 fixed to the casing. An internal cone member 8 is mounted on the projecting end of the shaft by means of keys 9 and is held thereon by a nut 10.

An external cone member 11 having a lining 12 for engaging the member 8 is formed axially with a projecting sleeve 13. The sleeve is provided externally with keys 14 whereby it is slidably and non-rotatably mounted in a bearing 15 in the housing 7. The sliding movement of the external cone member is limited in one direction by engagement with the internal cone member and in the opposite direction by engagement of its boss 16 with the inside face 17 of the bearing.

The sleeve 13 is provided with aligned openings 18—18 for receiving a pin 19 adjacent its inner end. A toggle joint bar extending into the sleeve is formed in two parts, one part 20 being pivotally mounted on the pin 19 and the other part 21 being pivotally mounted on an eccentric finger 22 on the end of a shaft 23 which is parallel to the pin 19. The parts 20 and 21 are threadedly connected for the purpose of adjusting the length of the bar, the inner part preferably having a socket 24 and the outer part having a stem 25. A laterally projecting lug 26 on the part 20 has an inclined face 27 adapted to engage a conical seat 28 formed internally in the sleeve to limit movement of the toggle joint bar in one direction.

The other bar of the toggle joint is constituted by that portion of the shaft 23 between its axis and the axis of the eccentric finger 22. The shaft 23 is mounted in a bearing 29 which is attached to the housing 7. A lever 30 is provided on the outer end of the shaft and is normally held by a spring 31 in a position to break the knee of the toggle joint and withdraw the external cone member from engagement with the internal member. The brake is applied by acting on the lever to angularly displace the eccentric finger 22 to the position shown in Fig. 1 to move the external cone member 11 inwardly and hold it in engagement with the internal cone member 8.

I claim:

1. In a brake, a casing, a housing fixed on the casing, a rotatable shaft extending from the casing into the housing, an internal cone member fixed on the rotatable shaft, an external cone member having an axial sleeve slidably and non-rotatably mounted in the housing, a bar pivotally mounted in the sleeve, a shaft mounted in the housing transversely of the bar and having an eccentric finger pivotally engaging the bar, and means for rocking the transverse shaft.

2. In a brake, a housing, a rotatable shaft in the housing, a cone member fixed on the shaft, a cone member slidably movable into and out of engagement with the cone member on the shaft and having an axial sleeve non-rotatably mounted in the housing, a bar pivotally mounted in the sleeve, a shaft mounted in the housing transversely of the bar and having an eccentric finger pivotally engaging the bar, means for rocking the transverse shaft, and means on the bar engageable with the sleeve for limiting pivotal movement of the bar in one direction.

3. In a brake, a housing, a rotatable shaft in the housing, a cone member fixed on the shaft, a cone member slidably movable into and out of engagement with the cone member on the shaft and having an axial sleeve non-rotatably mounted in the housing, a bar pivotally mounted in the sleeve, a shaft mounted in the housing transversely of the bar and having an eccentric finger pivotally engaging the bar, and means for rocking the transverse shaft.

4. In a brake, a housing, a rotatable shaft in the housing, a cone member fixed on the shaft, a cone member slidably movable into and out of engagement with the cone member on the shaft and having an axial sleeve non-rotatably mounted in the housing, a two-part adjustable bar pivotally mounted in the sleeve, and an actuating shaft carried by the housing and having an eccentric finger for reciprocating the bar.

5. In a brake, a housing, a rotatable shaft in the housing, a cone member fixed on the shaft, a cone member slidably movable into and out of engagement with the cone member on the shaft and having an axial sleeve non-rotatably mounted in the housing, a bar pivotally mounted in the sleeve, and an actuating shaft carried by the housing and having an eccentric finger for reciprocating the bar.

HARRY A. KNOX.